United States Patent
Konsant

(10) Patent No.: US 7,850,020 B2
(45) Date of Patent: Dec. 14, 2010

(54) STORAGE CARTS

(75) Inventor: Anthony N. Konsant, Winnetka, IL (US)

(73) Assignee: Konstant Products, Inc., Rolling Meadows, IL (US)

( * ) Notice: Subject to any disclaimer, the term of this patent is extended or adjusted under 35 U.S.C. 154(b) by 1179 days.

(21) Appl. No.: 11/230,107

(22) Filed: Sep. 19, 2005

(65) Prior Publication Data

US 2006/0012140 A1 Jan. 19, 2006

Related U.S. Application Data

(63) Continuation-in-part of application No. 10/990,130, filed on Nov. 16, 2004, now Pat. No. 7,516,855, which is a continuation-in-part of application No. 10/874,657, filed on Jun. 22, 2004, now Pat. No. 7,201,243.

(51) Int. Cl.
  *B61F 9/00* (2006.01)
(52) U.S. Cl. .................... 211/162; 211/1; 280/47.34; 104/242; 104/245
(58) Field of Classification Search ............. 211/151, 211/162; 104/118, 119, 242, 245; 301/1, 301/121; 280/655.1, 47.34
See application file for complete search history.

(56) References Cited

U.S. PATENT DOCUMENTS

| | | | | |
|---|---|---|---|---|
| 1,633,260 A | * | 6/1927 | Ledbetter | 38/36 |
| 1,647,640 A | * | 11/1927 | Ledbetter | 38/36 |
| 1,647,642 A | * | 11/1927 | Ledbetter | 38/36 |
| 1,653,860 A | * | 12/1927 | Ledbetter | 38/36 |
| 1,769,701 A | * | 7/1930 | Linden | 188/5 |
| 2,197,273 A | * | 4/1940 | Lindeman | 280/771 |
| 2,217,816 A | * | 10/1940 | Ronning | 280/124.119 |
| 2,437,907 A | * | 3/1948 | Casper | 16/46 |
| 2,544,924 A | * | 3/1951 | Herold | 105/170 |
| 3,295,462 A | * | 1/1967 | Bradt | 104/172.2 |
| 3,338,181 A | * | 8/1967 | Dorrance | 104/178 |
| 3,478,697 A | * | 11/1969 | Bradt | 104/172.2 |
| 3,478,698 A | * | 11/1969 | Jones | 104/172.2 |
| 3,479,665 A | * | 11/1969 | Jones | 104/172.2 |
| 3,559,584 A | * | 2/1971 | Frantz et al. | 104/88.06 |
| 3,923,354 A | | 12/1975 | Young | |
| 4,075,949 A | * | 2/1978 | Davis et al. | 104/162 |
| 4,246,847 A | * | 1/1981 | Chapman et al. | 104/172.2 |
| 4,274,644 A | * | 6/1981 | Taylor | 280/39 |
| 4,290,166 A | | 9/1981 | Melara | |
| 4,467,924 A | | 8/1984 | Morcheles | |
| 4,537,577 A | | 8/1985 | Sansome | |
| 4,559,027 A | | 12/1985 | Sattel | |
| 4,592,284 A | * | 6/1986 | Fukuda | 104/140 |
| 4,592,536 A | * | 6/1986 | Jasinski | 254/8 R |
| 4,618,191 A | | 10/1986 | Peterman | |

(Continued)

OTHER PUBLICATIONS

Brochure: SYMOTECH AB, Symotech Pallet Drawer (English).

(Continued)

*Primary Examiner*—Katherine W Mitchell
*Assistant Examiner*—Colleen M Quinn
(74) *Attorney, Agent, or Firm*—Niro, Haller & Niro

(57) ABSTRACT

Storage carts for the storage of pallets and other loads that may be moved between an open position into an aisle for access to the load and a closed position out of the aisle when desired.

11 Claims, 17 Drawing Sheets

U.S. PATENT DOCUMENTS

| | | | | |
|---|---|---|---|---|
| 4,655,466 | A * | 4/1987 | Hanaoka | 280/47.371 |
| 4,702,174 | A * | 10/1987 | Tredwell et al. | 104/172.2 |
| 4,794,863 | A * | 1/1989 | Gates et al. | 101/165 |
| 4,944,231 | A | 7/1990 | Leist | |
| 5,024,164 | A | 6/1991 | Leist | |
| 5,137,159 | A | 8/1992 | Collins | |
| 5,195,630 | A * | 3/1993 | Donovan et al. | 198/465.3 |
| 5,205,627 | A | 4/1993 | Davison | |
| 5,249,823 | A * | 10/1993 | McCoy et al. | 280/656 |
| 5,299,816 | A * | 4/1994 | Vom Braucke et al. | 280/33.998 |
| 5,482,422 | A * | 1/1996 | Hammond | 414/276 |
| 5,597,217 | A * | 1/1997 | Hoska et al. | 312/201 |
| 5,816,604 | A | 10/1998 | Hsieh | |
| 5,967,346 | A | 10/1999 | Price, Jr. | |
| 6,024,376 | A * | 2/2000 | Golichowski et al. | 280/655.1 |
| 6,024,416 | A * | 2/2000 | Chen et al. | 301/121 |
| 6,039,422 | A | 3/2000 | Butters | |
| 6,079,941 | A * | 6/2000 | Lee | 414/812 |
| 6,161,485 | A | 12/2000 | Muth | |
| 6,231,138 | B1 | 5/2001 | Janson | |
| 6,363,860 | B1 | 4/2002 | Andre | |
| 6,471,309 | B1 | 10/2002 | Turner | |
| 6,526,702 | B2 | 3/2003 | Jones | |
| 6,615,448 | B2 * | 9/2003 | Melara | 16/35 R |
| 6,669,314 | B1 | 12/2003 | Nemec | |
| 6,688,708 | B1 | 2/2004 | Janson | |
| 6,843,180 | B1 | 1/2005 | Keaton | |
| 2005/0082246 | A1 | 4/2005 | Krummell | |
| 2005/0279608 | A1 | 12/2005 | Konstant | |
| 2006/0102574 | A1 | 5/2006 | Konstant | |

OTHER PUBLICATIONS

Brochure: SYMOTECH AB, Symotech Pallet Drawer (Swedish).
Brochure: Rack Engineering Division, Storage Products.
Brochure: Proper Storage Systems, Shelf and Unit Construction.
Web page: Frazier, Glide 'N Pick (2004).
Brochure: E-Z Glide.

* cited by examiner

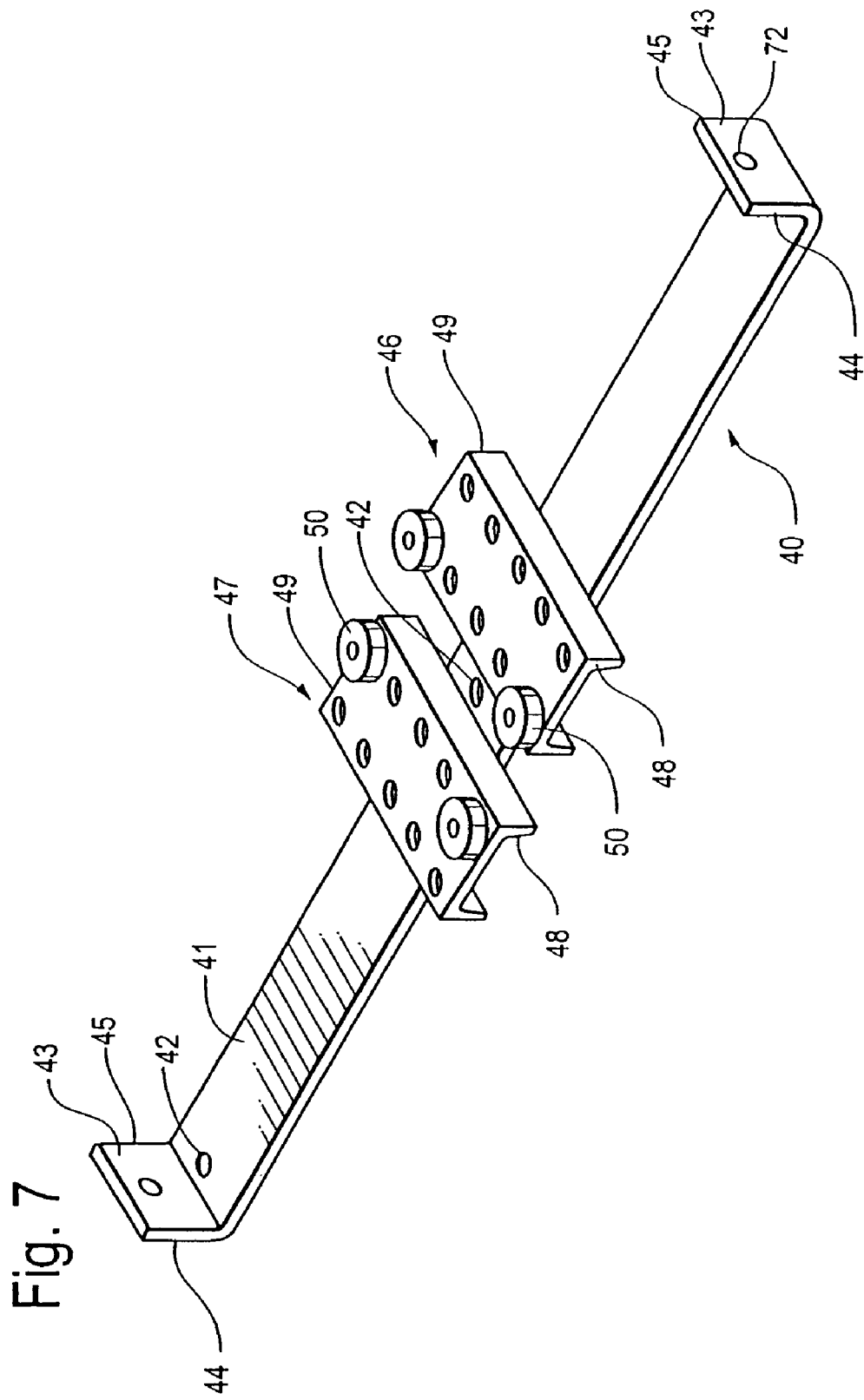

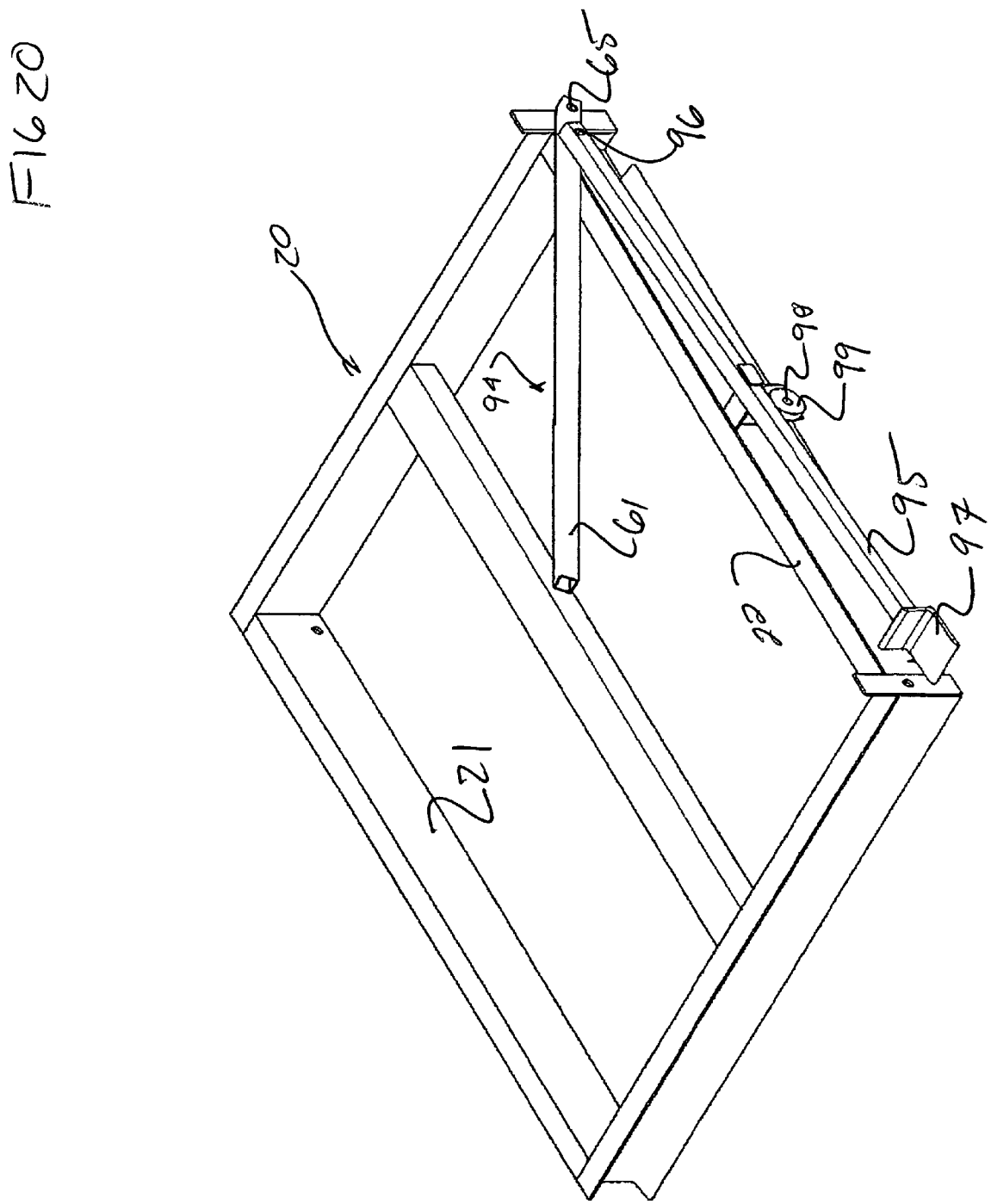

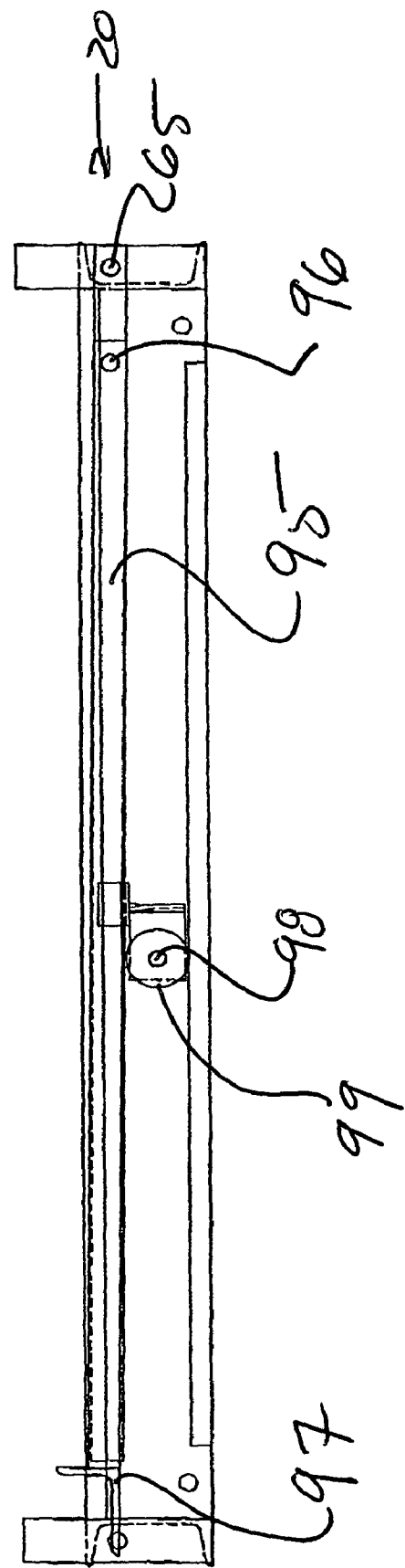

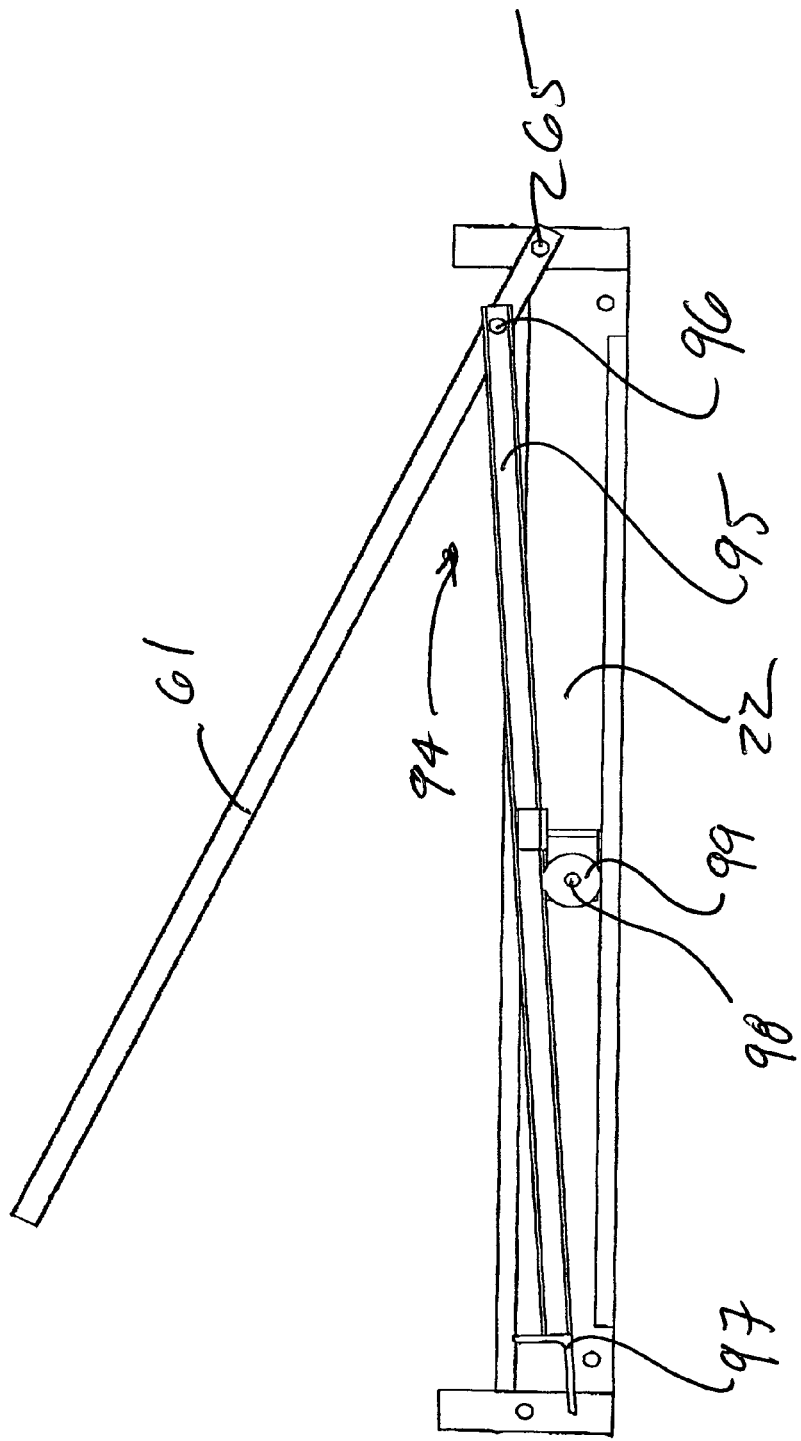

STORAGE CARTS

This application is a continuation-in-part of U.S. patent application Ser. No. 10/990,130, filed on Nov. 16, 2004, now U.S. Pat. No. 7,516,855 B2, which is a continuation-in-part of U.S. patent application Ser. No. 10/874,657, filed on Jun. 22, 2004, now U.S. Pat. No. 7,201,243 B2.

BACKGROUND OF THE INVENTION

The present inventions relate generally to storage devices that support pallets and other loads. More particularly, the present inventions relate to storage carts that are moveable between an open position where loads may be accessed and a closed position for storage. The storage carts of the present inventions are capable of supporting heavy loads, yet are efficiently moveable to permit easy access, may be secured against undesired movement and are guided against undesired lateral movement.

There are numerous types of storage systems available to store a variety of loads. For example, in the warehouse industry, shelf type storage systems are widely used. In general, many of these systems are configured to form shelves to support loads, pallets and their loads, and the like. Access to the stored loads is typically limited to warehouse personnel using fork lifts and the like.

At typical consumer warehouse stores, such as home improvement warehouses, inventory goods are stored in areas out of the reach of the public. In the same facility, individual items are accessible to the public and made available for consumer purchase. As a result of the increasing presence and popularity of such consumer warehouse stores, a need has developed to accommodate the efficient storage of heavy items (for example, bags of sand, concrete and gravel), while at the same time permitting convenient and safe access to these items by consumers and/or store personnel.

In a typical home improvement warehouse store, storage racks are arranged to form aisles for consumer and employee access. These racks are typically arranged in back to back arrays that may extend from the floor to ceiling height. A typical home improvement warehouse store receives a wide variety of goods that arrive on pallets. For inventory item storage, pallets and their loads are placed on shelves on the upper portion of the racks, usually above the reach of the consumer. The lower portion of the racks, which are under the upper storage shelves, form bays which are used to make individual items accessible to the consumer. For many types of items, displays or shelves are used within the bays to enable the selection of individual items by the consumer. Many such items may be easily reached by the consumer, regardless of whether those items are at the front of the bay or the rear of the bay. In this manner, the most inventory possible can be stored in the available space and the consumer has access to the products.

However, the storage and accessibility of relatively heavy items available at warehouse stores has created problems and potential safety hazards. For example, a home improvement warehouse store selling bags of ready mix concrete typically puts a pallet full of individual bags for consumer access in the storage bay created under the inventory storage shelves or racks. As the bags in the front of the pallet are sold, the remaining bags are on the rear of the pallet are located in the rear of the bay under the shelves. Because of their weight and location, these items become extremely difficult and awkward to access.

In such situations, store personnel could shift the pallet (or items on the pallet) to make the remaining items accessible, restock the pallet with additional items, or potentially lose a sale because a consumer foregoes a purchase when the item cannot be reached. However, personal injury could result to the consumer or store employee who attempts to lift a heavy item in an awkward position in the back of the storage bay. Another way to avoid these problems is to place a load of the heavy items in the aisle, end cap or other area where there would be relatively unobstructed access to them. However, this is an inefficient use of space, can block aisles and lead to other problems.

To overcome the accessibility and other problems, some have attempted to develop moveable drawers for such items. These drawers are designed to be moveable from a rear position underneath the bay to a forward position generally into the aisle, where items on the rear of the pallet may be accessed. However, known devices suffer from a number of problems, including poor or difficult operation, waste of vertical space, complexity and expense.

SUMMARY OF THE INVENTION

The present inventions overcome the problems associated with the storage of and access to heavy items. For example, the present inventions provide a storage cart system having a storage cart capable of front to back movement of a load on a generally flat surface, the storage cart having a guide rail and wheels. A guide assembly secured to the generally flat surface is provided, the guide assembly cooperating with the guide rail to permit front to back movement of the cart without undesired lateral movement, and a handle or control arm pivotably mounted to the cart. The wheels of the wheeled cart of the present invention may include four wheel assemblies, each wheel assembly having two pairs of wheels on each side of a web of a support stringer of the cart. An axle that is flexibly mounted on the cart to permit vertical movement of the wheels is also provided. The guide assembly may further include a base, locking flanges, guide brackets and guide bearings.

The present inventions further provide for a storage cart for supporting a pallet or other load on a generally flat surface, the cart being moveable between a closed position and an open position, and having a guide rail. A guide assembly having a base secured to the generally flat surface, a guide bracket and a guide bearing attached to the guide bracket that cooperates with the guide rail are also provided. A control arm pivotably mounted to the cart and permitting the selective movement of the cart, typically from an open position to a closed position is also provided, as well as a locking flange to help prevent undesired movement.

The present inventions also provide, among other things, a storage cart for moveably storing a load, the cart being capable of movement along a generally horizontal support surface between a closed and an open position, the cart having a guide rail. The moveable storage cart also including wheel means for rollably supporting the cart on the surface, guide means for cooperating with the guide rail and preventing undesired lateral movement of the cart, control arm means for enabling the selective movement of the cart and locking means for securing the cart against undesired movement between an open and closed position.

The present invention further provides for a storage cart selectively moveable between a forward and rear position, including a guide assembly and a control arm assembly having a rotatable control axle, a hinge assembly and a control handle. The control axle may also include locking pins that cooperate with upturned locking flanges to secure the cart in the forward or rear position and prevent undesired movement or operation.

The present invention still further provides for a storage cart capable of front to back movement of a load on a generally flat surface. The cart includes wheels and a guide rail and a guide assembly cooperating with the guide rail to permit front to back movement of the cart. A handle is attached to the cart and a foot activated handle release assembly is also provided.

Accordingly, an object of the present invention is to provide storage carts that may be moved between an open position and a closed position to provide ready access to goods stored on the carts.

Another object of the present invention is to provide a moveable storage cart that may be secured against undesired opening or closing.

An additional object of the present invention is to provide a storage cart that has wheels that may move vertically to accommodate irregularity of the ground or horizontal support surface.

A further object of the present invention is to provide a moveable storage cart that may be moved as desired, but is controlled against undesired lateral movement.

Still a further object of the present invention is to provide a selectively moveable storage cart having the components necessary for selective operation integral within the width of the cart.

Yet an additional object of the present invention is to provide a storage cart for use in storing heavy items in warehouse stores that may be selectively moved to an open position for access to the items and may be selectively moved out of the aisle and closed.

Yet a further object of the present invention is to provide a moveable storage cart that can be retrofitted into existing rack storage systems.

INVENTOR'S DEFINITION OF THE TERMS

The terms used in the claims of this patent are intended to have their broadest meaning consistent with the requirements of law. Where alternative meanings are possible, the broadest meaning is intended. All words used in the claims are intended to be used in the normal, customary usage of grammar and the English language.

BRIEF DESCRIPTION OF THE DRAWINGS

The stated and unstated features and advantages of the present inventions will become apparent from the following descriptions and drawings wherein like reference numerals represent like elements in the various views, and in which:

FIG. 2A is an exploded perspective view of details of the front cart components, guide assembly and control arm assembly of the storage cart of FIG. 2;

FIG. 3A is an exploded perspective view of details of the rear cart components, guide assembly and control arm assembly of the storage cart of FIG. 3;

FIG. 7 is a perspective view of a preferred guide assembly of the present invention;

FIG. 20 is a perspective view of a typical storage cart showing a preferred embodiment of a foot activated handle release assembly;

FIG. 21 is a side view of a typical storage cart with the foot activated release assembly in a closed position; and FIG. 22 is a side view of a typical storage cart with the foot activated release assembly in an activated or open position.

DETAILED DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

Typically, there is a front side of the storage rack structure of a warehouse store which is adjacent to an access aisle and a back side of the system which usually abuts another storage rack and to which there is typically no access from the front aisle. The present inventions will be described herein in nonlimiting detail by reference to shelf-type storage systems that are typically found in consumer warehouse stores which are accessed only from one side, that is, the front or access aisle. However, the present inventions are fully applicable to a wide variety of other storage applications as well.

Figure 1:
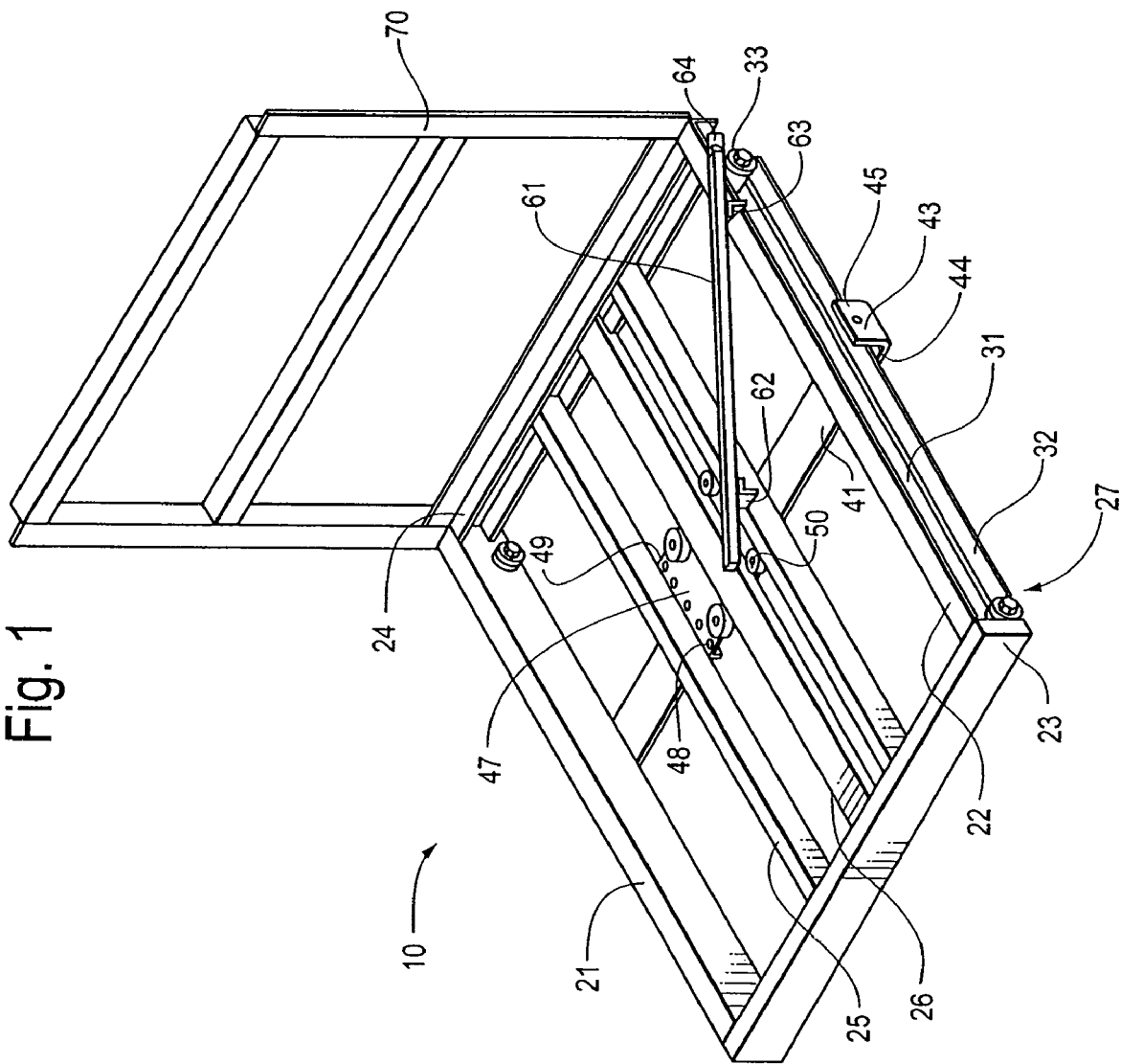
FIG. 1 is a perspective view of a preferred storage cart of the present invention shown in an intermediate position between the opened and closed positions and including an optional backstop.
Figure 2:
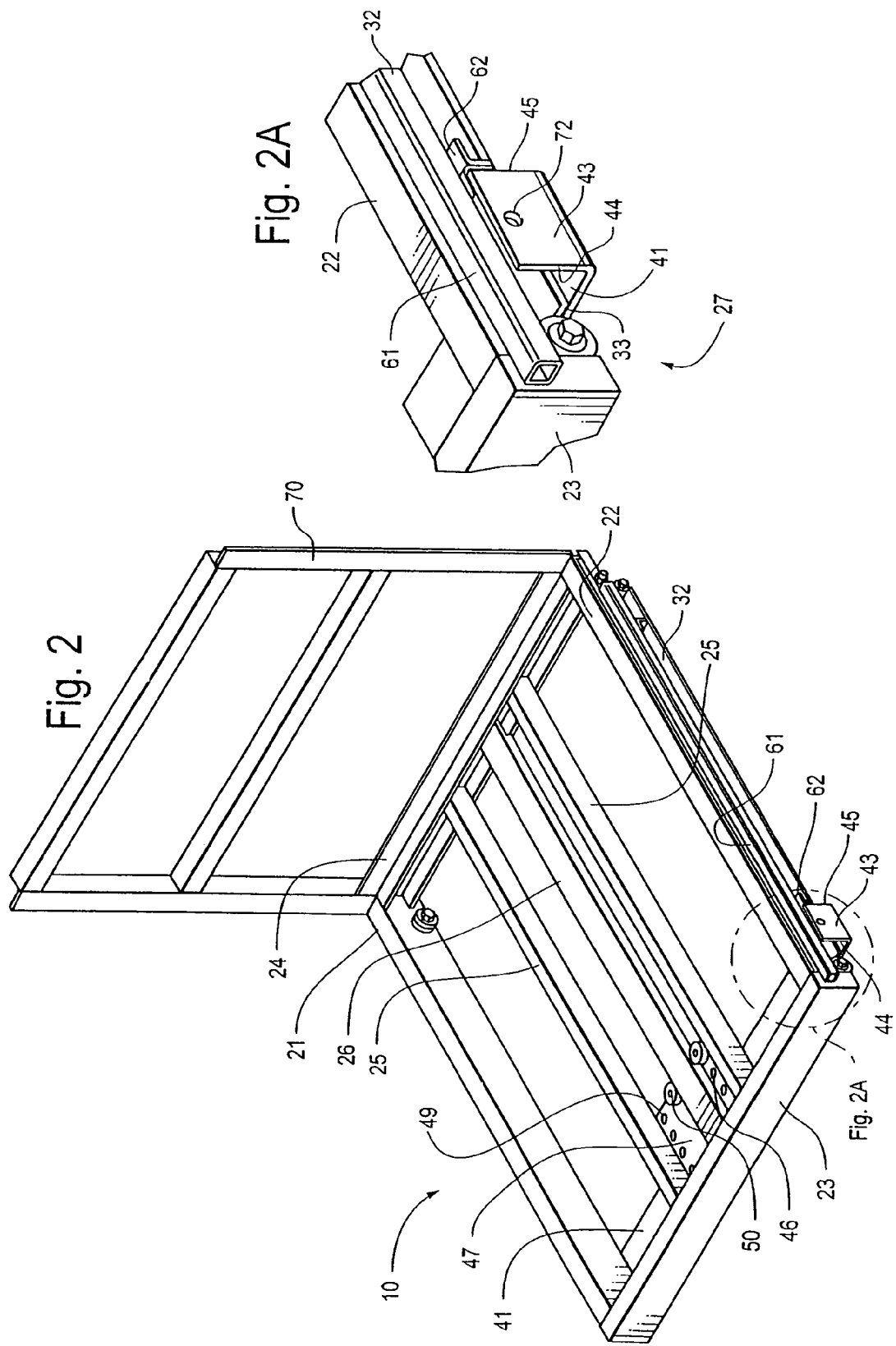
FIG. 2 is a perspective view of the preferred storage cart of FIG. 1, shown in a fully closed and locked position.
Figure 3:
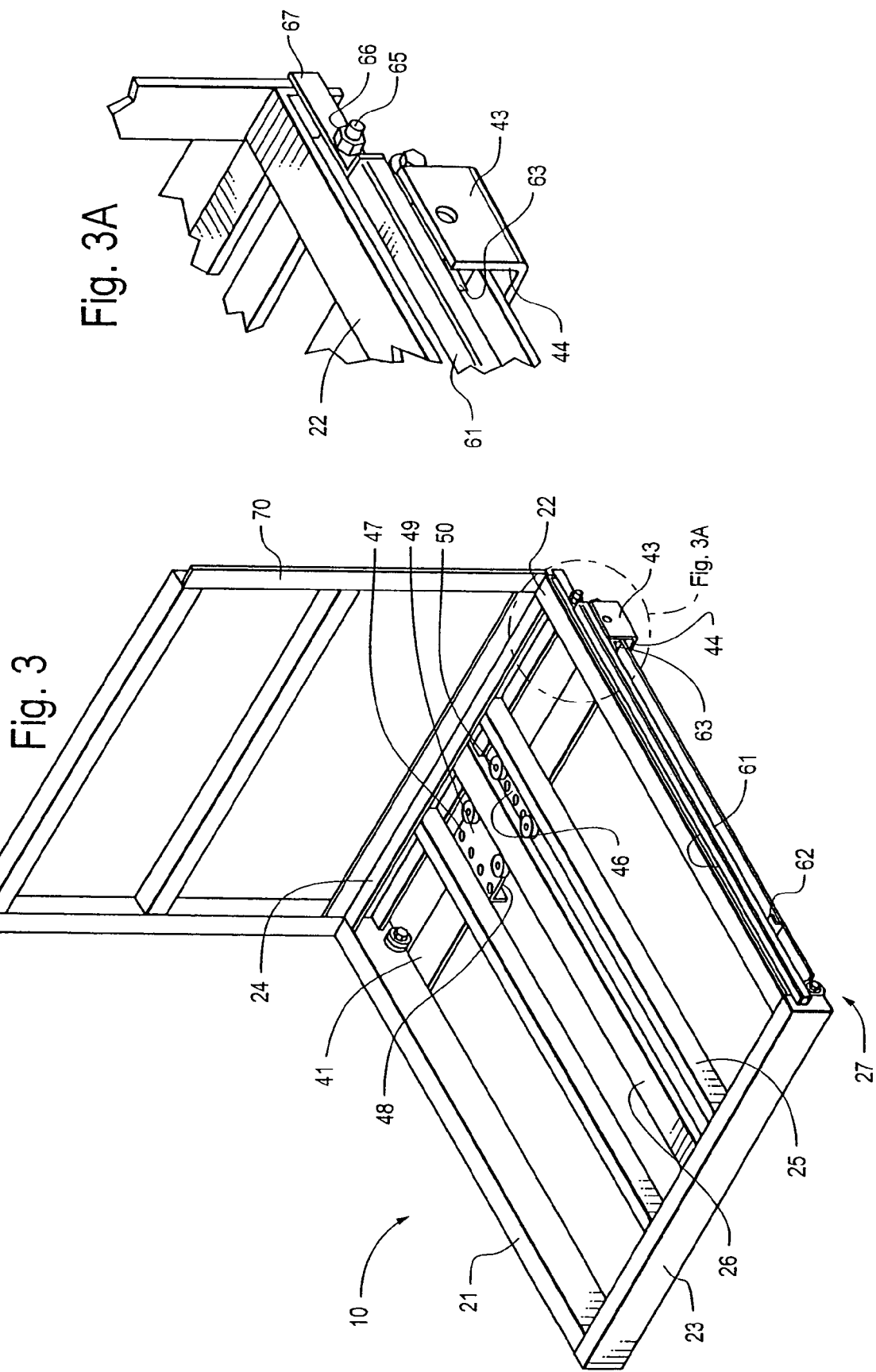
FIG. 3 is a perspective view of a preferred storage cart of FIG. 1 shown in a fully open and locked position.

A preferred embodiment of a storage cart of the present invention is shown generally as 10 in FIG. 1. It is designed to roll on a generally flat surface or floor (not shown) of a warehouse or consumer warehouse store, which is typically a concrete slab. The storage cart 10 is sized to support a standard pallet and its load and to fit within the bays created by typical shelf or rack type storage systems and below the shelves used for the storage of inventory items. As hereinafter described, storage cart 10 is substantially completely under a shelf and/or substantially out of the access aisle when in a fully retracted or closed position toward the rear of a storage bay, as shown in FIG. 2, and extends substantially into the aisle or out of the bay when in its fully extended or open position, as shown in FIG. 3. It will be understood by those of skill in the art that the present inventions are equally applicable to other storage settings, and may be used in situations without storage bays and may be of a variety of sizes.

It will be understood by those of skill in the art that the components of storage cart 10 and its related assemblies may be constructed from a wide variety of materials (e.g., wood, iron, steel or aluminum) having a variety of cross-sectional shapes (such as channels, angles, tubing, I-beams and S-beams). However, these particular standard structural components are not required to practice the inventions, as other structural members of different cross sections may also be advantageously fabricated and employed to practice the claimed inventions.

Figure 4:
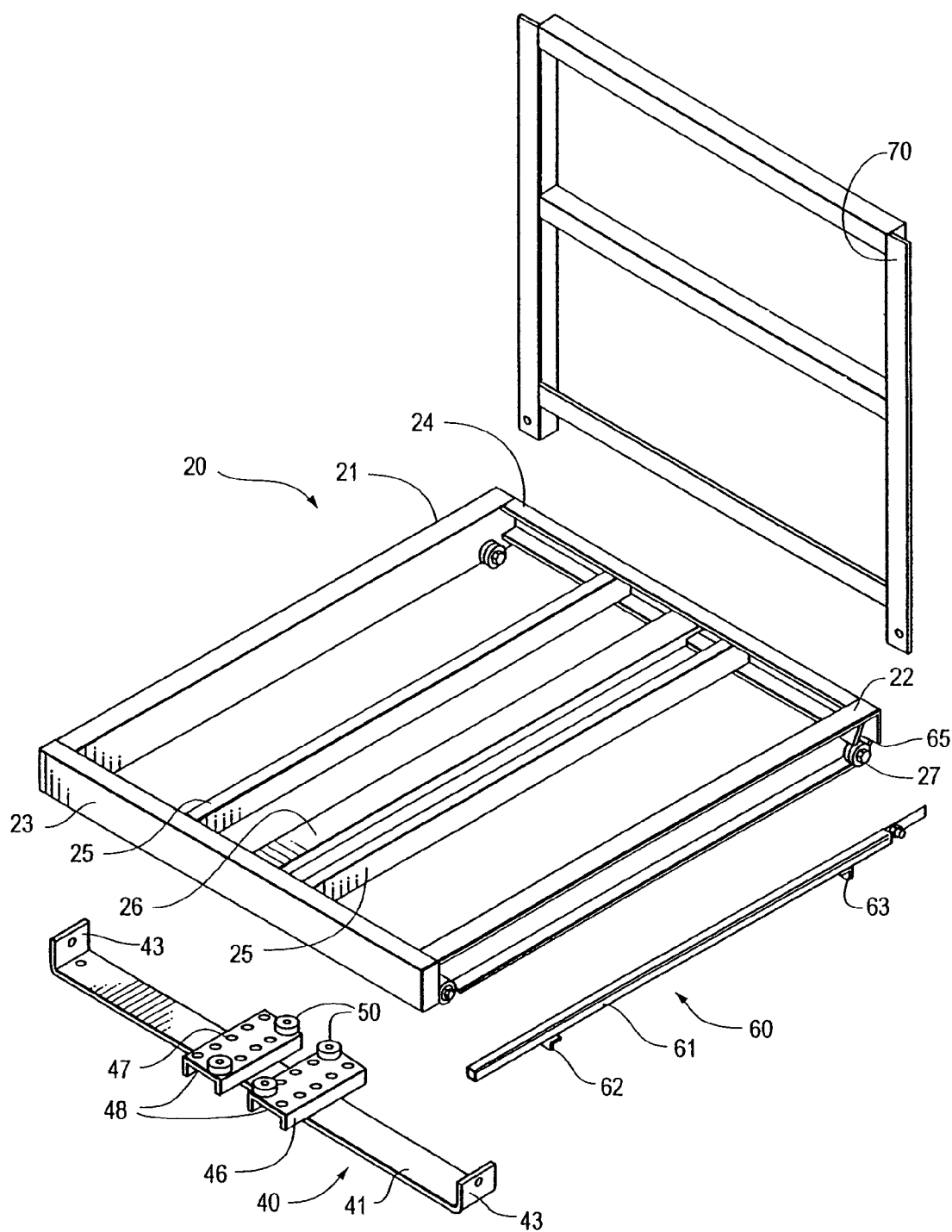
FIG. 4 is an exploded perspective view of a preferred storage cart of the present invention showing the cart assembly, guide assembly, control arm and an optional backstop.
Figure 5:
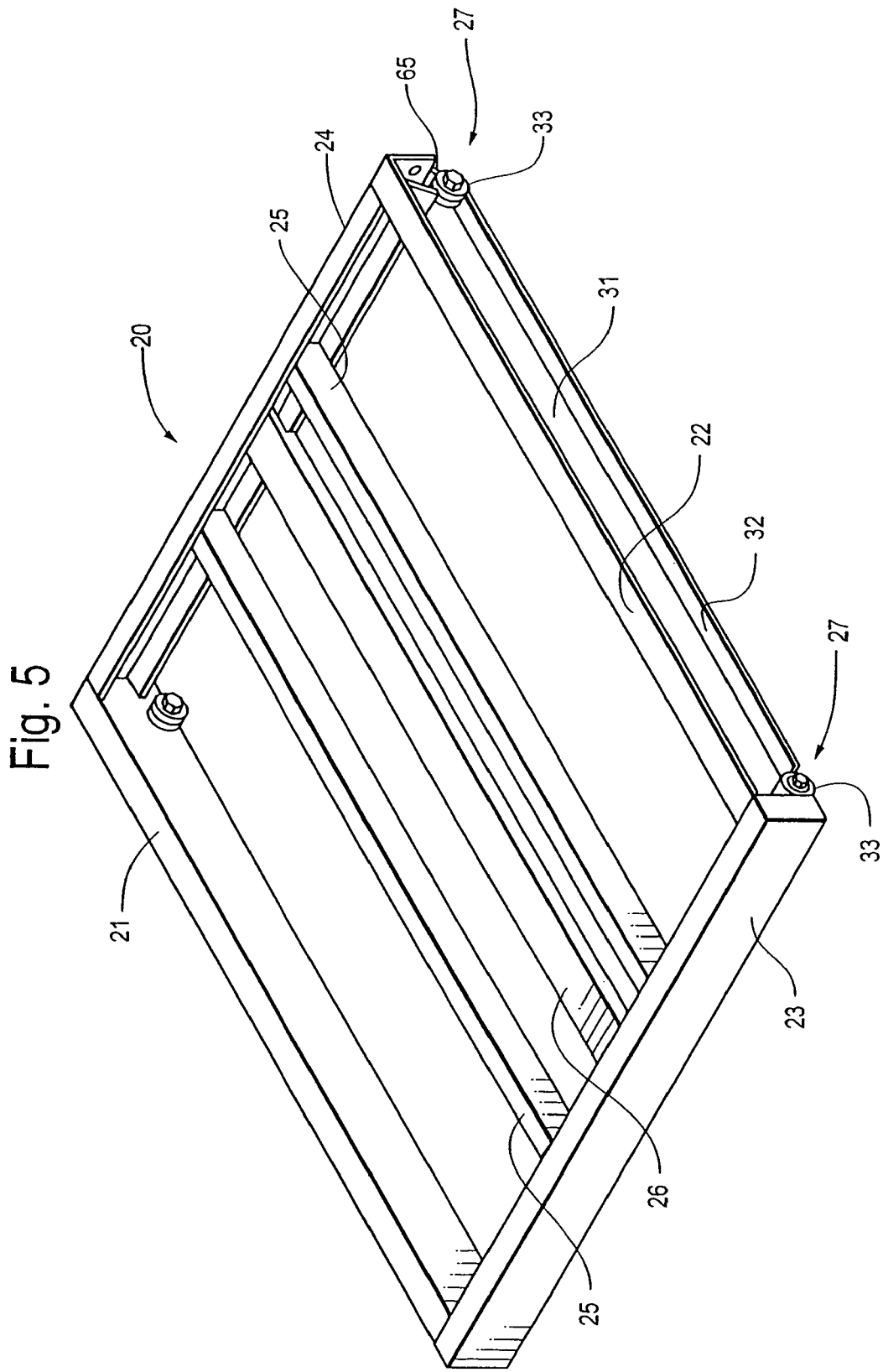
FIG. 5 is a perspective view of a preferred embodiment of a cart assembly of the present invention.
Figure 6:
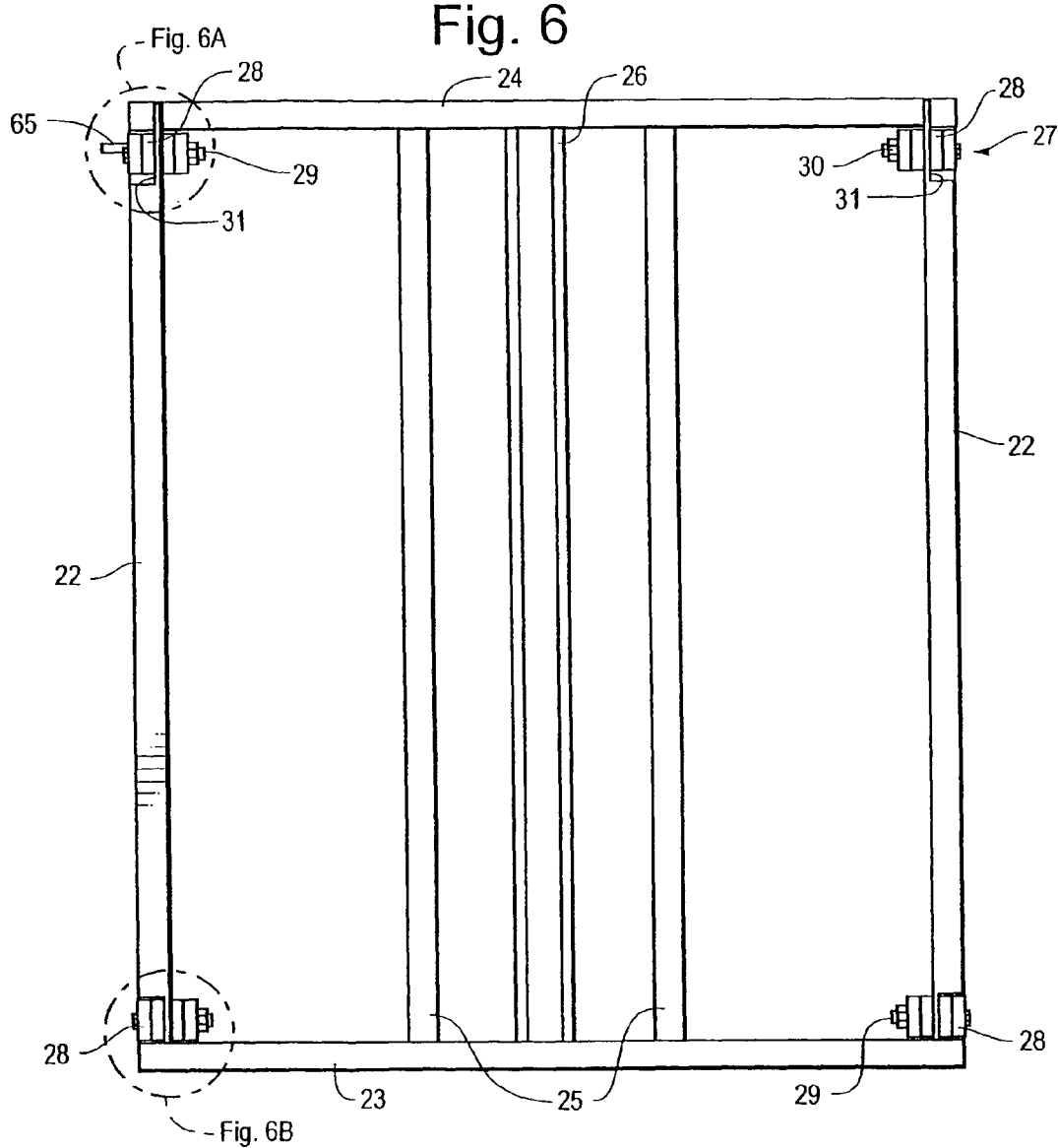
FIG. 6 is a bottom plan view of the storage cart of FIG. 5.
Figure 6A:
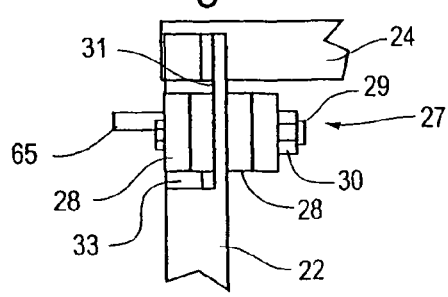
FIG. 6A is a detail plan view of components of a preferred rear wheel assembly of the cart of FIG. 6.
Figure 6B:
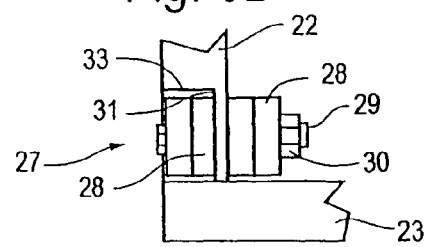
FIG. 6B is a detail plan view of components of a preferred front wheel assembly on the cart of FIG. 6.

The storage carts of the present invention generally include three principal component systems. As shown in FIG. 4, the present invention includes a wheeled cart assembly 20, a guide assembly 40 and a control arm assembly 60. As shown in FIGS. 4, 5 and 6, wheeled cart assembly 20 includes a left side support stringer 21 and a right side support stringer 22, both of which may be constructed from structural channels. Cart assembly 20 also includes a front support stringer 23 and a rear support stringer 24, which also may be constructed of structural channels. All of the support stringers 21, 22, 23 and 24 are connected together in a variety of well known ways, such as welding or bolts, to form a generally rectangular frame. Depending upon the application and design requirements, intermediate support members 25 may also be provided. In a preferred embodiment of the present invention, a guide rail 26 is provided between front 23 and rear 24 stringers to interact with guide assembly 26 to prevent undesired lateral movement, as hereinafter described. Guide rail 26 may also be constructed or installed to serve as an intermediate support (not shown) for cart assembly 20.

Cart assembly 20 also includes wheel assemblies 27, preferably at each corner of the cart assembly 20. As shown in FIG. 6, the preferred wheel assembly 27 includes two pairs of wheels 28, an axle 29 associated with each wheel assembly 27, as well as a nut 30 or other means for rotatably securing the wheels 28 to the axle 29. In the preferred embodiment, axle 29 is in the form of a bolt which is secured to nut 30.

Axle 29 passes through a hole (not shown) located in the web 31 (see also FIG. 5) of right stringer 22 and left stringer 21. In the preferred embodiment, the holes (not shown) through web 31 of left and right stringers 21 and 22 are of a larger diameter than axle 29. In this manner, vertical up and down movement of axle 29 of the wheel assemblies 27 is permitted to accommodate irregularities of the slab upon which the wheels 28 of cart assembly 20 ride during operation. Similarly preferred, but not required, is the use of split pairs of wheels 28 on either side of web 31. For example, single wheels 28 on either side of web 31 may be used. Alternatively, a single wheel 28 or caster (not shown) may be used to practice the invention by hinging or pivoting the caster at a point about the wheel 28 and attaching it to the cart assembly 20. In these manners, the wheels 28 of cart assembly 20 remain in rolling contact with the floor and provide flexibility to accommodate irregularities of the floor surface to permit smooth operation. It will be understood by those of skill in the art that the type of wheels 28 and/or wheel assemblies 27 selected, as well as their attachment to the cart assembly 20, will depend upon, among other things, the type of structures used for cart assembly 20, as well as cost considerations and the environment in which the devices are used.

In the preferred embodiment, the lower flange 32 of each side stringer 21 and 22 is provided with a notch 33 to permit the pair of wheels 28 on the outside of cart assembly 20 to contact the ground, slab or other surface (not shown). Because standard structural channels are used for the side stringers 21 and 22 for the described embodiment, no notches are required for the pair of wheels on the interior of cart assembly 20. It will be understood, however, that any structural member may be used and a notch 33 may or may not be necessary.

Guide assembly 40 of the present invention is best seen by reference to FIG. 7. Guide assembly 40 includes a base 41 which may be attached to the warehouse floor slab (not shown) through holes 42 or other readily available means. Base 41 is provided with upturned locking flanges 43 extending outside the width of cart assembly 20 that act to lock cart assembly 20 against undesired movement, as hereinafter described. Flanges 43 have front edges 44 and rear edges 45. Although flanges 43 are shown as integral with base 41, other structures, or separate structures, may be employed to perform or enable the locking function, as hereinafter described. In addition, locking flanges 43 may also be located within the width of cart assembly 20 (see FIGS. 11-12).

A right guide bracket 46 and a left guide bracket 47 are also provided which may be attached to base 41 by welding or other well known means. Each guide bracket 46 and 47 has a front end 48 and a rear end 49. Guide bearings 50 are attached to guide brackets 46 and 47. Guide bearings 50 may be rollers, wheels, pads or other preferably low friction devices as will be understood by those of skill in the art. The spacing between right bracket 46 and left bracket 47, as well as the placement of guide bearings 50, is designed to movably cooperate with guide rail 26 of cart assembly 20, so that cart assembly 20 may be moved forward into the aisle and backward out of the aisle without undesired lateral movement or skewing. In a preferred embodiment, guide brackets 46 and 47 also serve to limit or contain the amount of cart movement between the open and closed positions, as hereinafter described.

Figure 8:
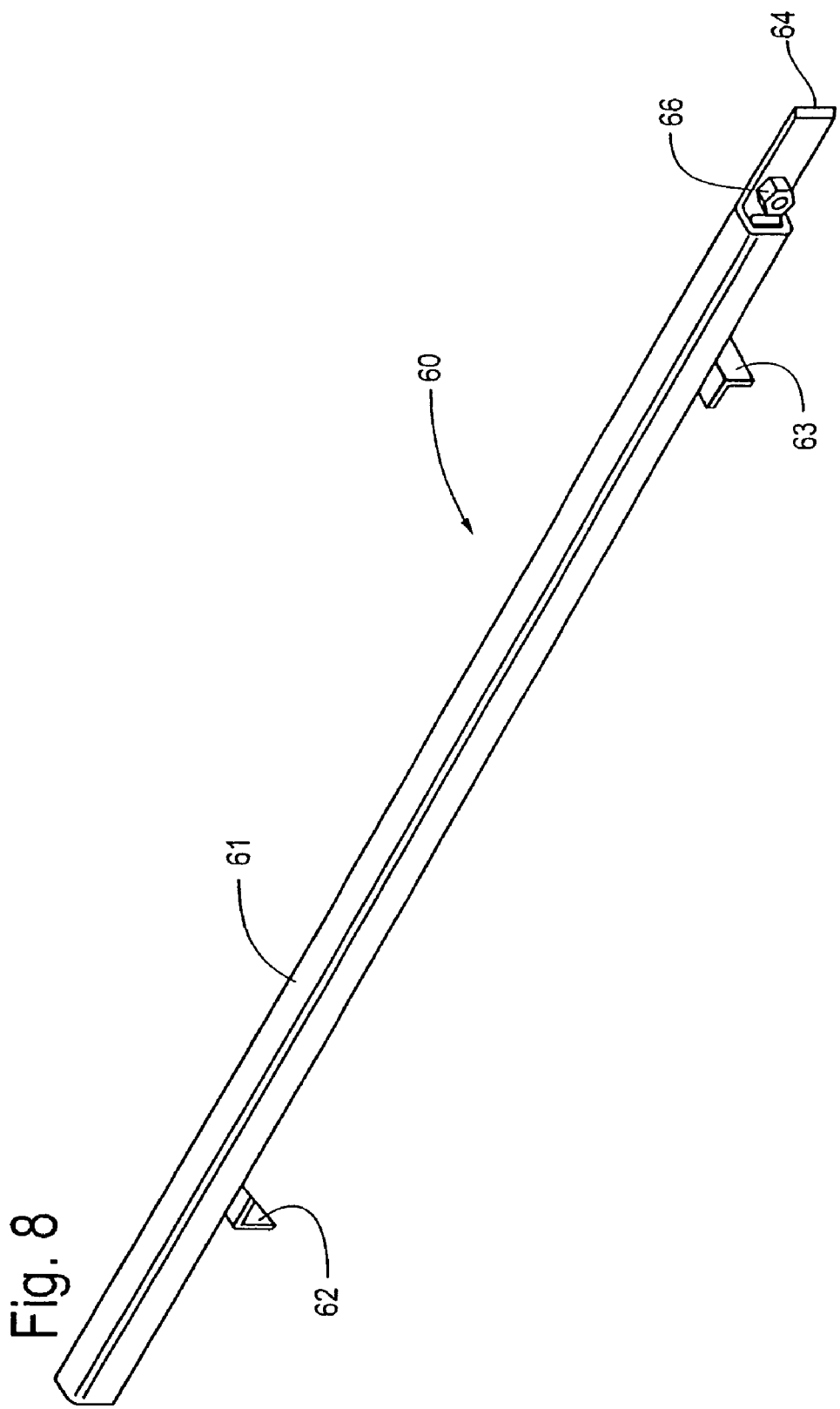
FIG. 8 is a perspective view of a preferred control arm assembly of the present invention.

The third principal assembly, control arm assembly 60 is best seen by reference to FIG. 8, although other embodiments are described and shown (see e.g., FIGS. 10-19). In a preferred form, control arm assembly 60 includes a handle 61 that is pivotably mounted to the rear of cart assembly 20. Handle 61 is of sufficient length so that it may be readily gripped to move cart assembly 20, but not protrude into the aisle when the cart 20 is in a closed position. A front locking tab 62 and a rear locking tab 63 are provided on handle 61 to engage the front edge 44 or rear edge 45 of locking flange 43 to lock cart assembly 20 against undesired movement, as hereinafter described. The rear end of handle 61 is pivotably mounted to a pivot post 65 (see FIG. 3A) of cart assembly 20 through a hole 66 on an alignment plate 64. In this manner, control arm 60 may rotate from a generally horizontal position along the plane of cart assembly 20 to a variety of vertical positions so that the cart assembly 20 may be moved when desired.

It will be understood by those of skill in the art that, although preferred, it is not required that control arm assembly 60 have a pivotably mounted handle 61 or that it be provided with means to lock the cart against undesired movement. In fact, a single pull type handle (not shown) may be attached to the cart assembly 20 to be pulled or pushed when movement of the cart is desired. An embodiment having a foot activated handle release assembly 94 without means to lock the cart assembly 20 will be hereinafter described.

Having now described the primary assemblies and associated components of preferred embodiments of the present invention, its operation may be better seen by reference to FIGS. 1-3. FIG. 2 shows the storage cart 10 of the present inventions in a retracted or closed position, typically within the bay and substantially underneath shelf type storage racks. When in this position, the handle 61 of control arm assembly 60 is in its lowest position. As shown in FIG. 2A, front locking tab 62 of handle 61 engages the rear edge 45 of locking flange 43 so that cart assembly 20 may not roll or be pulled laterally out into the aisle.

When access to items (not shown) on the rear of the cart assembly 20 is desired, handle 61 may be rotated upward to an intermediate position as shown in FIG. 1. When the handle is lifted, front locking tab 62 disengages rear edge 45. Thus, when handle 61 is pulled, cart assembly 20 may roll laterally forward into the aisle. To prevent undesired lateral movement and aid in ease of moving the cart assembly 20, guide bearings 50 cooperate with guide rail 26. Cart assembly 20 may be extended until rear stringer 24 engages rear end 49 of guide brackets 46 and 47 to its fully extended or open position. At this point, as shown in FIG. 3, handle 61 may be lowered. In the preferred embodiment, handle 61 may be rotated to a variety of operative positions so that each user can leverage the handle 61 to move the cart 20 and its load as desired.

As shown in FIG. 3A, when handle 61 is lowered, cart assembly 20 may then be locked in a fully extended position. This locking function is accomplished in the preferred embodiment when the rear locking tab 63 of handle 61 is lowered and engages front edge 44 of locking flange 43. In this manner, the cart assembly 20 may not be inadvertently moved rearward when, for example, an item is being removed.

After unloading or as otherwise desired, handle 61 may be rotated vertically upward (see FIG. 1) so that rear locking tab 63 disengages front edge 44 and cart assembly 20 may be pushed rearward with handle 61. Cart assembly 20 is then permitted to roll rearward until front end 48 of guide brackets 46 and 47 come in contact with front stringer 23. When fully retracted, handle 61 may be rotated downward and locked into position as described above.

Figure 10:
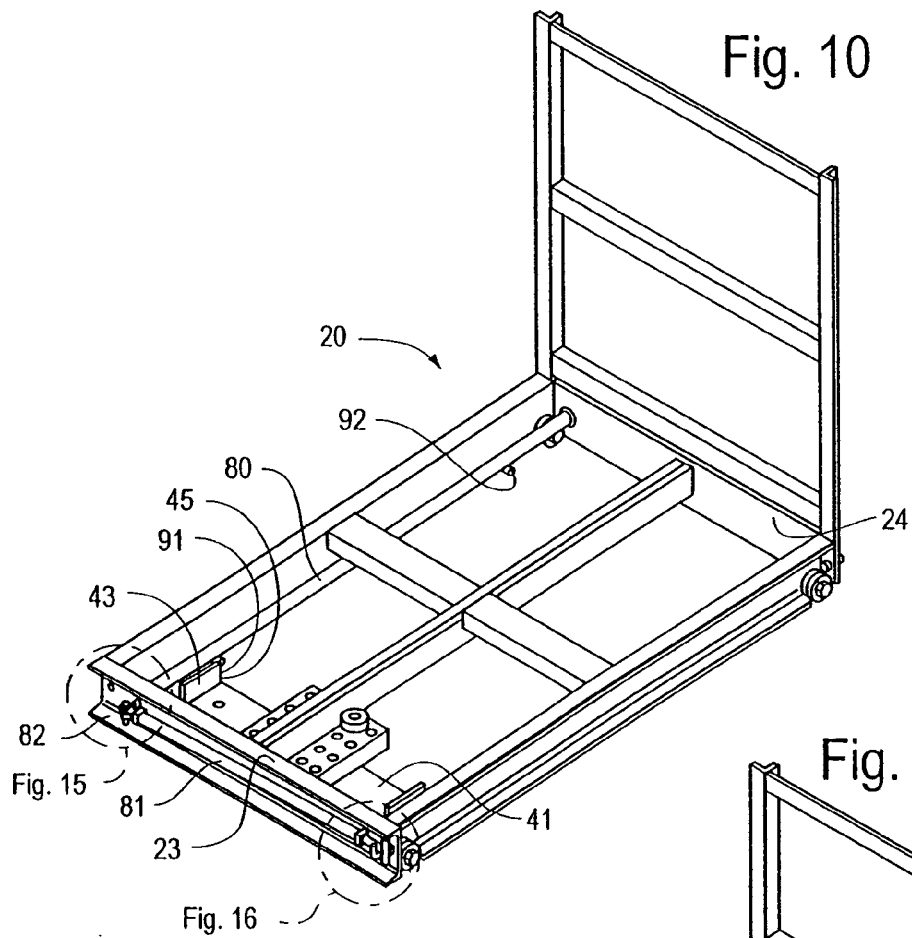
FIG. 10 is a perspective view of a storage cart of the present invention having an alternative control arm assembly shown in the fully closed and locked position.
Figure 11:
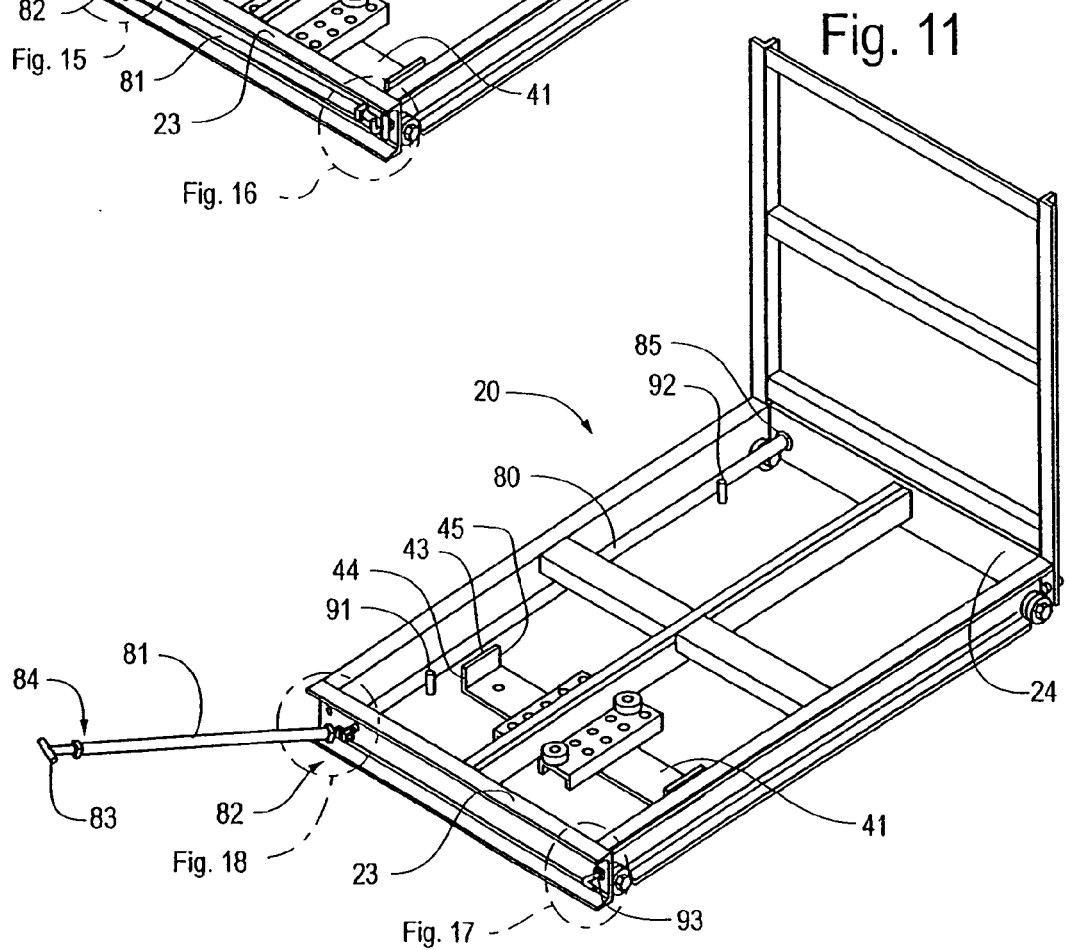
FIG. 11 is a perspective view of the storage cart of FIG. 10 shown in an intermediate position.
Figure 12:
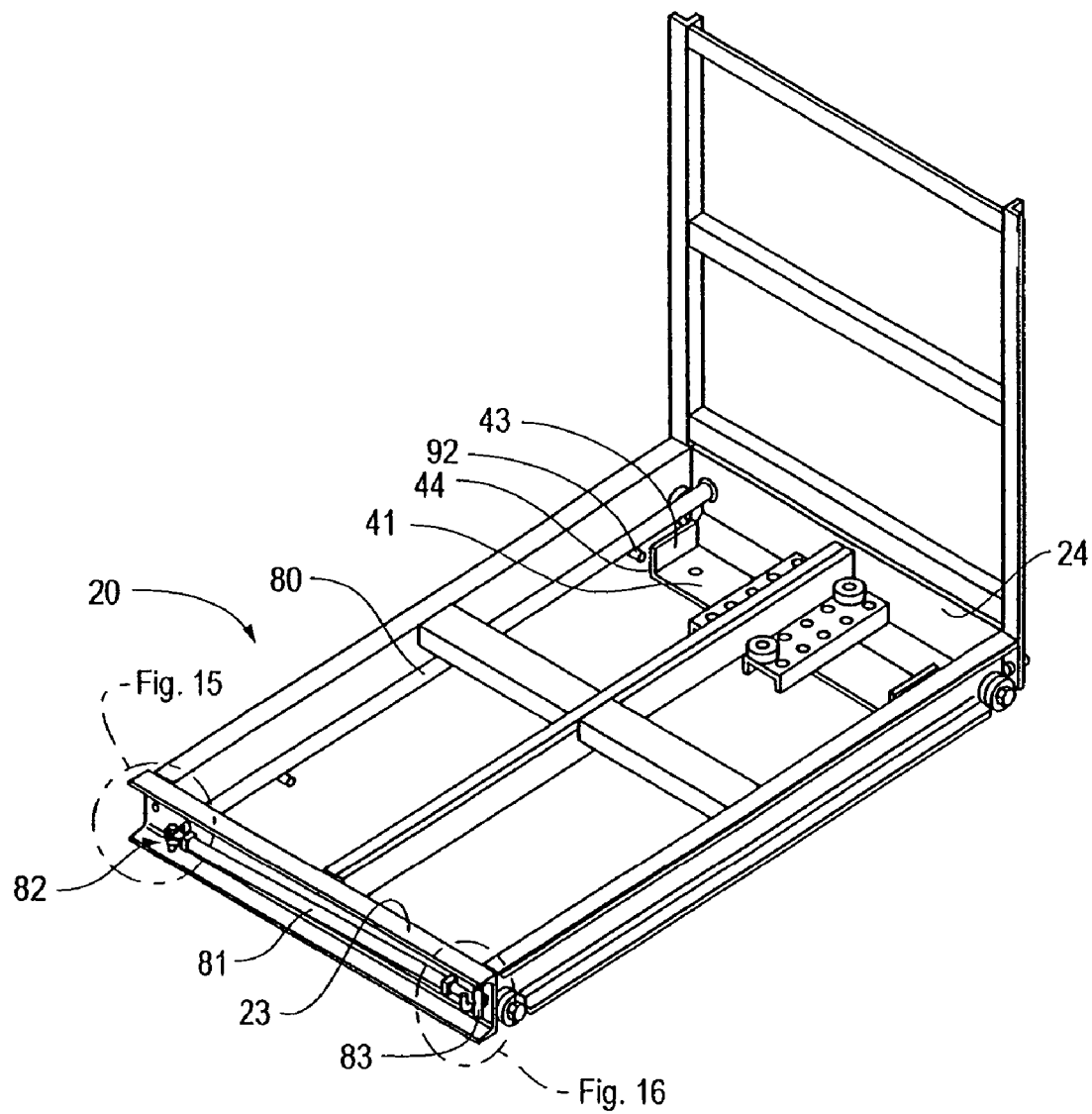
FIG. 12 is a perspective view of the storage cart of FIG. 10 shown in a fully open and locked position.
Figure 13:
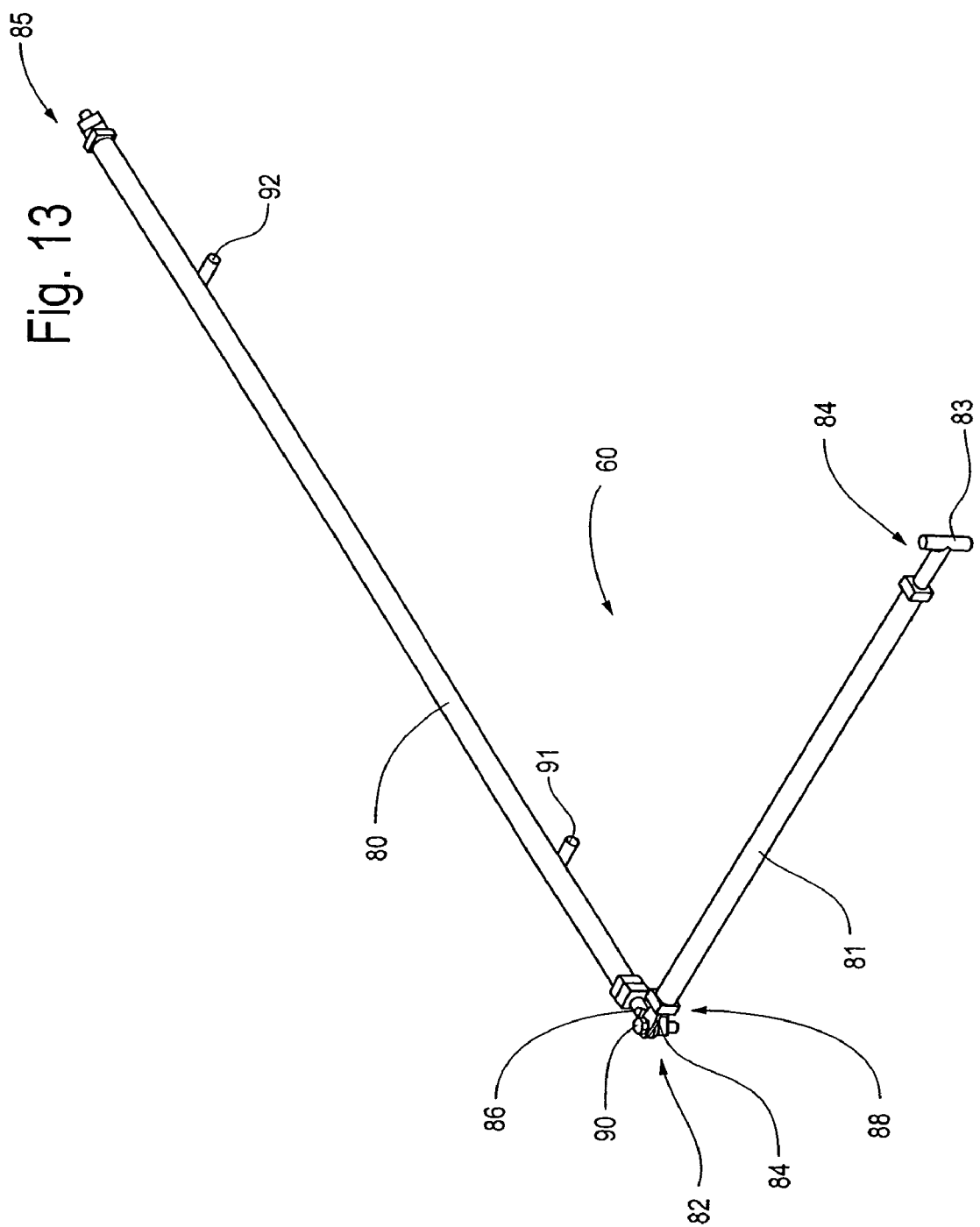
FIG. 13 is a perspective view of the components of an alternative embodiment of a control arm assembly shown in a locking position.
Figure 14:
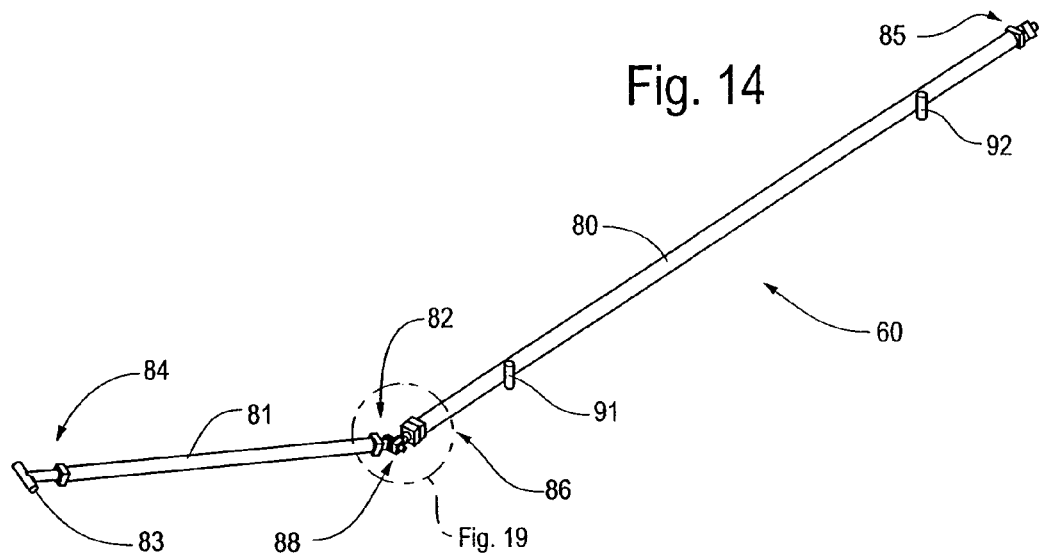
FIG. 14 is a perspective view of the components of the alternative embodiment of the control arm assembly of FIG. 13 shown in an operative or unlocked position.
Figure 15:
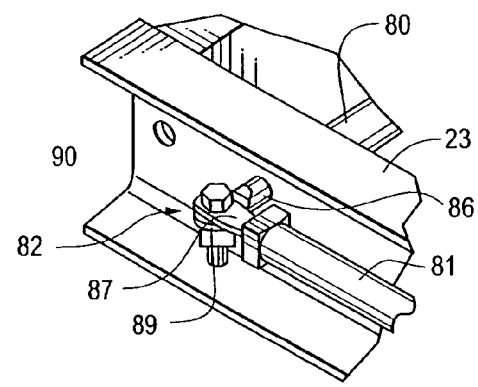
FIG. 15 is an exploded perspective view of details of a hinge assembly of FIG. 10 shown in a closed or locked position.

In a preferred embodiment, locking flange 43 is provided with a handle locking hole 72. Locking hole 72 is provided so that handle 61 may be locked into the lowered position by a pad lock or other device inserted in locking hole 72 and prevent the lifting and upward rotation of handle 61. Also in a preferred embodiment, handle 61 includes a rear alignment plate 64. Alignment plate 64 contacts the outer edge of rear stringer 24 during the rotation of handle 61. In this manner, when handle 61 is lifted and pulled or pushed to move cart assembly 20, handle 61 is kept in alignment with the edge of cart assembly 20. In other embodiments of control arm assembly 60, alignment tabs 64 are not necessary (FIGS. 10-12).

Figure 9:
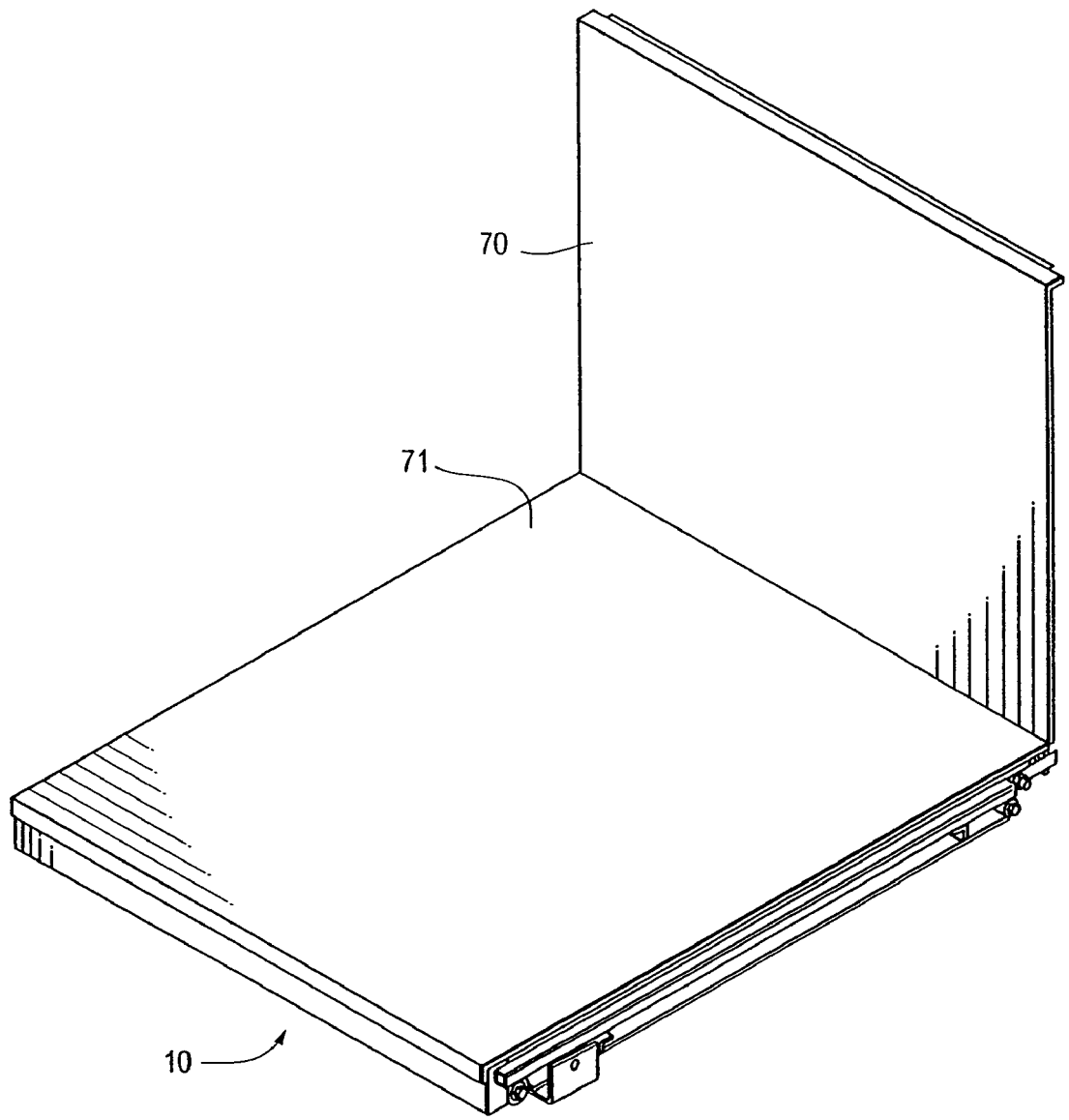
FIG. 9 is a perspective view of a preferred storage cart of the present invention shown with optional decking and optional backstop and in a fully retracted or closed position.

As shown in FIG. 9, cart assembly 20 may be provided with an optional backstop 70 to prevent items from falling behind cart assembly 20. And, also as shown in FIG. 9, optional decking 71 may be provided on cart assembly 20 and/or optional backstop 70.

An alternative embodiment of control arm assembly 60 is shown in FIGS. 10-19. In this embodiment, upturned locking flanges 43 of base 41 are positioned within the width of cart assembly 20 and include a front edge 44 and a rear edge 45. Control arm assembly 60 includes a rotatable control axle 80, a control handle 81 and a hinge assembly 82. A grip 83 may also be provided at the free end 84 of control handle 81.

Control axle 80 is rotatably mounted on cart assembly 20 between rear support stringer 24 and front support stringer 23. Control axle 80 may be rotatably mounted by any well known means, such as bolts, washers and the like. As shown in FIGS. 10-12, control axle 80 is preferably mounted within cart assembly 20. Alternatively, this embodiment of control arm assembly 60 may be adapted to be mounted outside the width of cart assembly 20, if upturned locking flanges 43 or other suitable structures are also located outside the width of cart assembly 20. Although not required, in this embodiment the flanges of preferred front support stringer 23 face forward to house control handle 81 and hinge assembly 82.

In the preferred embodiment, rear end 85 of control axle 80 is rotatably mounted through a hole in the support stringer 24 by well known means. Front end 86 of control axle 80 is adapted to receive or manufactured to include a member to function as part of hinge assembly 82. In a preferred embodiment, front end 86 is adapted to receive a flattened flange 87 or other member that is removably attached to front end 86, and which protrudes through front support stringer 23. The flattened flange 87 or other member may be secured to control axle 80 by any well known means, such as bolts, locking nuts and the like. Similarly, the opposite end 88 of control handle 81 is also adapted to receive or provided with a flattened flange 89 or similar member (see e.g., FIG. 19). The flattened flanges 87 and 89 are provided with holes. Hinge assembly 82 is formed by overlapping the flattened flanges 87 and 89. A hangar bolt 90 or other pin type member is inserted through the holes of overlapping flattened flanges 87 and 89, and may be secured by a nut.

As a result of the configuration of hinge assembly 82, control handle 81 may be rotated in the horizontal and vertical directions. When control handle 81 is rotated in the vertical direction, control axle 80 is caused to rotate (in this example, in a counter-clockwise direction). Control axle 80 is provided with a front locking pin 91 and a rear locking pin 92. Thus, when control axle 80 is caused to rotate, locking pins 91 and 92 rotate as well.

Figure 16:
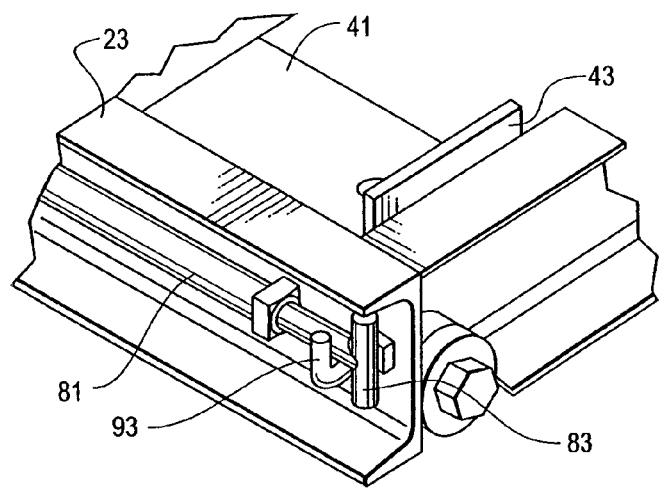
FIG. 16 is an exploded perspective view of details of a grip and grip lock of FIG. 10 shown in a closed and locked position.
Figure 17:
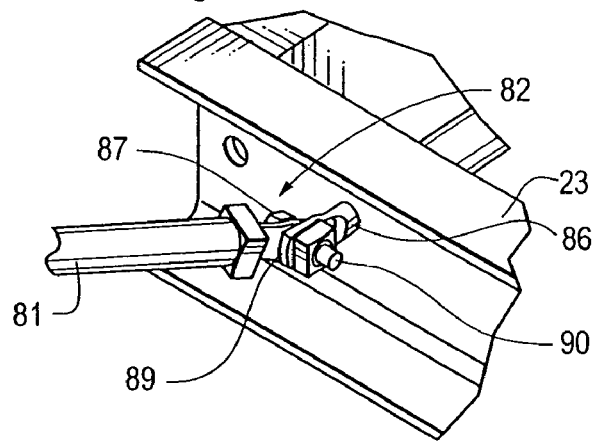
FIG. 17 is an exploded perspective view of the details of hinge assembly of FIG. 11 shown in an open or operative position.
Figure 18:
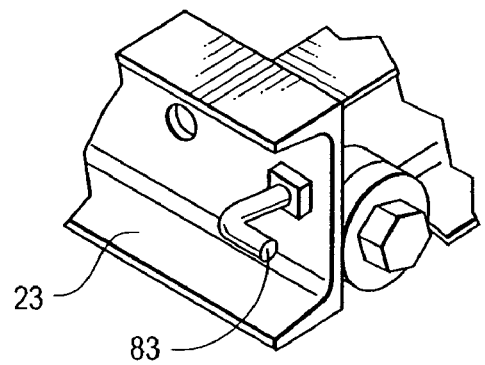
FIG. 18 is an exploded perspective view of details of the grip lock of FIG. 11.
Figure 19:
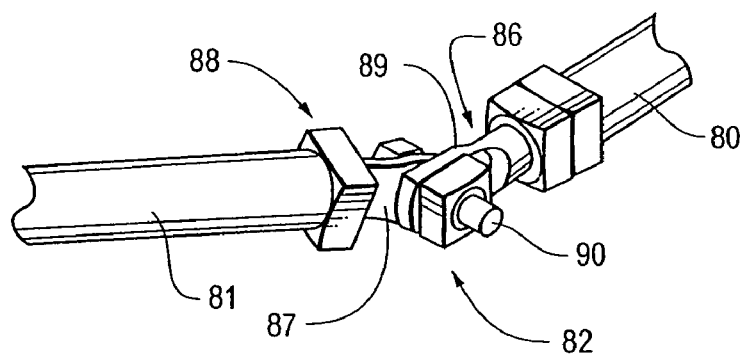
FIG. 19 is a perspective view of details of the hinge assembly of FIG. 15 shown in an open or operative position.

FIG. 10 shows cart assembly 20 in its retracted or closed and locked position. When closed, control handle 81 is in a substantially horizontal position within the channel of front support stringer 23. As shown in FIG. 10, front locking pin 91 engages the rear edge 45 of upturned locking flange 43 so that cart assembly 20 may not roll or be pulled out and into the aisle. For added safety or security, front support stringer 23 may be provided with a grip lock member 93 that prevents control handle 81 from being rotated, as shown in FIGS. 10 and 16. In one embodiment, grip lock member 93 is an L-shaped bolt that can only be turned with wrench to permit handle operation when desired. For example, FIG. 16 shows the grip lock 93 in a locked position and FIG. 18 shows the grip lock 93 in an unlocked position.

When operation of this embodiment of the cart assembly 20 is desired, control handle 81 is rotated horizontally and vertically. As control handle 81 is rotated vertically, control axle 80 is rotated and front locking pin 91 disengages rear edge 45 of locking flange 43 (see FIGS. 11, 14 and 17-19). Movement of cart assembly 20 is now permitted and may be pulled forward into an aisle (see FIGS. 11 and 12). As a result of hinge assembly 82, control handle 81 may assume a variety of operative positions that best suit the user to move cart assembly 20 and its load.

When cart assembly 20 is in its forward most position, as shown in FIG. 12, control handle 81 may be rotated downward and rearward in to a horizontal position. As a result, control axle 80 is caused to rotate (here, clockwise), so that rear locking pin 92 engages the front edge 44 of upturned flange 43. In this manner, cart assembly 20 is prevented from undesired rearward movement. Control handle 81 may be locked by grip lock 93, if desired (see FIG. 12).

When desired, control handle 81 is rotated horizontally and vertically, causing control axle 80 to rotate and rear locking pin 92 disengages upturned flange 43. This permits cart assembly 20 to be pushed rearward and locked in a fully retracted position (see FIG. 10).

This embodiment of control arm assembly 60 is particularly useful is situations where pallets or loads on cart assembly 20 overhang the left side support stringer 21 and/or the rear side support stringer 22. It is also useful where no additional space is available to accommodate a control arm assembly 60 that is located outside by the width of cart assembly 20.

In certain storage applications, it is desirable to be able to more quickly move cart assembly 20 into an aisle for loading or unloading and quickly return cart assembly 20 to the rearward or stored position. For example, in storage settings where only warehouse personnel need to access goods stored on cart assembly 20, the ability to lock cart assembly 20 in an open or closed position may not be desired or necessary. In such settings, a foot activated handle release assembly 94 may be provided.

A preferred embodiment of foot activated handle release assembly 94 is shown in FIGS. 20-22. The components of a preferred system include handle 61, which is pivotably mounted to the rear of cart assembly 20 by pivot post 65 or other suitable means. It will be understood that although the embodiment of foot activated release assembly 94 is shown on the right side of cart assembly 20 adjacent to right support stringer 22, it may be located on the other side of cart assembly 20, or elsewhere.

Handle release arm 95 is pivotally connected to handle 61 at pivot point 96. The front end of release arm 95 may be provided with a foot pedal 97. A release arm pivot 98 is provided on right side support stringer 22, preferably in approximately the center of its length. An optional pivot wheel 99 may be rotatably mounted on release arm pivot 98. It will be understood that those components may be attached and/or connected by a variety of well known means, and in a variety of appropriate locations. Handle release arm 95 rests on top of pivot wheel 99.

The operation of handle release assembly 94 may be seen by reference to FIGS. 21 and 22. In FIG. 22, handle release assembly 94 and handle 61 are shown in an inoperative or closed position. When movement of cart assembly 20 is desired, an operator simply steps on foot pedal 97. This causes the front end of release arm 95 to rotate downward as it pivots about release arm pivot 98. The rear end of release arm 95 rotates upward, forcing handle 61 to rotate upward so that it may be grasped by the operator and the cart assembly 20 pushed or pulled as desired.

In a preferred embodiment, release arm pivot 98 and wheel 99 are located in approximately the center of right support stringer 22. If release arm pivot 98 and wheel 99 are located too far rearward, too little effort would be required to raise handle 61. Conversely, if release arm pivot 98 and wheel 99 are located too far forward, too much effort is required to raise handle 61. It will be understood by those of skill in the art that the force required to raise handle 61 may be adjusted by adjusting the length of release arm 95, the point at which release arm 95 is pivotably mounted to handle 61 and/or by the location of release arm pivot 98 and wheel 99.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention.

Various features of the present inventions are set forth in the following claims.

What is claimed is:

1. A storage cart capable of front to back movement of a load on a generally flat, horizontal support surface comprising:
   a cart having wheels on each side of said cart and a generally horizontal guide rail on said cart positioned between said wheels, said generally horizontal guide rail generally parallel to the generally flat, horizontal support surface;
   a guide assembly secured to the generally flat, horizontal surface, said guide assembly cooperating with said generally horizontal guide rail of said cart to permit front to back movement of said cart without undesired lateral movement, wherein the guide assembly includes a base, a locking flange, a guide bracket and guide bearing within the sides of said cart;
   a handle having a front and rear end, the rear end of said handle pivotably attached to said cart and the front end of said handle extending toward the front of said cart; and,
   a foot activated handle release assembly for selectively enabling operation of the handle, said release assembly having a release arm with a front and rear end, the rear end of said release arm pivotably mounted to the rear end of said handle, and the front end of said release arm extending toward the front of said cart such that downward pressure applied to the front end of said release arm causes the handle to rotate upward so that it is accessible to enable selective movement of said cart.

2. The invention of claim 1 wherein said wheels of said cart include four wheel assemblies, each wheel assembly having two pairs of wheels on each side of a support stringer of said cart.

3. The invention of claim 2 wherein an axle rotatably supports said wheels and said axle is flexibly mounted on said cart to permit vertical movement of said wheels.

4. The invention of claim 1 wherein said foot activated handle release assembly includes a release arm pivot.

5. The invention of claim 1 wherein said wheels are casters.

6. A storage cart having a length and width for supporting a pallet or other load on a generally flat and horizontal surface, said cart moveable from a closed position to an open position, comprising:
   a cart having wheel supports and laterally spaced wheels on each side of said cart to permit said movement of said cart, and a generally horizontal guide rail positioned longitudinally between said laterally spaced wheels;

a guide assembly secured to said generally flat and horizontal surface, the guide assembly including a guide bracket and guide wheels that cooperate with said guide rail to prevent undesired movement of said cart;

a handle baying a front end and rear end and a length of at least half the length of said cart, the rear end of said handle pivotably attached to a rear portion of said cart and the front end extending forward of said rear end of said cart; and, a foot activated handle release assembly cooperating with said handle, said foot activated handle release assembly having a release ann with a rear end mounted near said rear end of said handle, and a front end extending toward the front of said cart such that downward pressure applied to the front of said arm causes said handle to rotate upward so that it is accessible to enable selective movement of said cart.

7. The invention of claim 6 wherein said wheels of said cart are flexibly mounted to permit vertical movement of said wheels.

8. A storage cart for moveably storing a load, said cart capable of movement along a generally horizontal support surface between a closed and an open position, said cart having a generally horizontal guide rail, comprising:

wheel means for rollably supporting said cart on said surface and for permitting movement of said cart between the open and closed positions;

guide means securable to said generally horizontal support surface for cooperating with said generally horizontal guide rail and preventing undesired movement of said cart, said guide means including guide wheels;

a handle for enabling the selective movement of said cart, said handle having a rear end pivotably mounted to a rear of said cart and a front end extending toward the front of said cart; and, a foot activated handle release assembly for selectively enabling operation of the handle, said foot activated handle release assembly having a release arm with a rear end mounted near said rear end of said handle, and a front end extending toward the front of said cart such that downward pressure applied to the front of said arm causes said handle to rotate upward so that it is accessible to enable selective movement of said cart.

9. The invention of claim 8 wherein said wheels means are casters.

10. The invention of claim 8 wherein said wheel means include two pairs of wheels provided on each side of said wheel support.

11. The invention of claim 8 wherein the handle release assembly includes a release arm pivot.

* * * * *

UNITED STATES PATENT AND TRADEMARK OFFICE
CERTIFICATE OF CORRECTION

| | | |
|---|---|---|
| PATENT NO. | : 7,850,020 B2 | Page 1 of 1 |
| APPLICATION NO. | : 11/230107 | |
| DATED | : December 14, 2010 | |
| INVENTOR(S) | : Anthony N. Konstant | |

It is certified that error appears in the above-identified patent and that said Letters Patent is hereby corrected as shown below:

Column 11, line 5, delete "baying" and replace with -- having --.

Column 11, line 12, delete "ann" and replace with -- arm --.

Signed and Sealed this
First Day of March, 2011

David J. Kappos
*Director of the United States Patent and Trademark Office*